United States Patent [19]
Koch

[11] 3,825,938
[45] July 23, 1974

[54] PHOTOGRAPHIC FOCUSING SCREEN CAMERA

[75] Inventor: Carl Koch, Stetten, Switzerland

[73] Assignee: Sinar AG Schaffhausen, Feuerthalen, Switzerland

[22] Filed: Feb. 5, 1973

[21] Appl. No.: 329,870

[30] Foreign Application Priority Data
Feb. 4, 1972 Switzerland.................... 1679/72

[52] U.S. Cl.................. 354/160, 354/189, 355/52
[51] Int. Cl. .......................................... G03b 27/68
[58] Field of Search........................... 355/52; 95/50

[56] References Cited
UNITED STATES PATENTS

| | | | |
|---|---|---|---|
| 2,335,700 | 11/1943 | Rogers | 355/52 |
| 2,736,230 | 2/1956 | Domeshek | 355/52 |
| 3,146,662 | 9/1964 | Pettis | 355/52 |
| 3,479,945 | 11/1969 | Koch | 95/50 |

Primary Examiner—Samuel S. Matthews
Assistant Examiner—Richard A. Wintercorn
Attorney, Agent, or Firm—Watson, Cole, Grindle & Watson

[57] ABSTRACT

A photographic focusing screen camera having adjustably mounted 9 and image carriers and a focusing arrangement for varying the distance between them, a swinging arrangement for one of the carriers for swinging it about a swing axis relative to the other carrier, a first scale and pointer on the swinging arrangement for reading the adjusted swing position, a focusing screen on the image carrier with markings on the screen for determining the limitations of a measuring basis on the screen, a second scale and pointer on the focusing arrangement for a measuring angle, the second scale having angular graduations in accordance with the formula: $\sin \alpha = \Delta S/M$ wherein M is the measurement of the measuring basis; S is difference of the focusing distance between the lens and the image points at the screen markings, necessary for obtaining sharp image of two parts of an object lying at different distances from the camera; and $\alpha$ is the angle by which the one carrier is to be swung in order to simultaneously produce a sharp image of the two different parts of the object on each of the markings.

18 Claims, 8 Drawing Figures

PHOTOGRAPHIC FOCUSING SCREEN CAMERA

The invention relates to a photographic focusing screen camera having an image carrier and a lens carrier connected to a common base of the camera and a focusing arrangement is provided for changing the distance between the carriers.

For adjustment of the carriers, at least one of them has a pivotal connection to the camera base for pivotally swinging the carrier in relation to the other. A first scale is provided at the pivotal connection for measuring the swing angle, and a pointer is arranged for reading the adjusted position of the pivoted carrier in relation to its zero or basic position.

It is well known that the photographic cameras, to which this invention generally relates, permit a simultaneous sharp image to be taken of two or three points of an object lying at various distances from the camera. As well the adjustment of perspective distortions of the image, for instance the correction of converging lines, is possible. In both said cases the image and/or lens carriers must be focused in accordance with the obligue object plane, following the well known "Scheimpflug rule." According to this rule, the image plane is adjusted correctly, if a plane passing through the optical center of the lens, being at right angles to the optical axis of the lens, as well as a plane connecting the parts of the object that are to be focused simultaneously, meet each other in a common line of intersection with the image plane.

Finding of this correct adjustment by trial-and-error method, is often troublesome and difficulties arise during operation. As the image carrier and/or the lens carrier is pivoted, not only does the focus distance of the pertinent parts of the screen image normally change, but a precession of the image also occurs. Generally, one of the points of the object cannot be simply first focused on the screen and the image or lens carrier then pivoted until a second point of the object appears sharply on the screen, because the adjustment of the focus of the first point of the object is again lost during pivotal movement. Such is possible only whenever the image carrier is pivotally moved with the swing axis of the image carrier lying within the visible area of the screen and precisely in the image plane of the camera. With such an arrangement, one point of the object can be focused on the swing axis of the image carrier and subsequently the image carrier can be swung about this swing axis until the image of a second point of the object also appears sharply on the screen, without a change of the first adjustment. However, such a camera is of a complex construction, which considerably increases the cost of production and is therefore less economical.

It is an object of the present invention to provide a photographic focusing screen camera of the type described in such a manner that, even by pivotally moving the lens carrier or, in the event that the swing axis of the image carrier is arranged outside the visible area of the screen and not precisely in the image plane of the camera, the correct adjustment of the camera according to "Scheimpflug's rule" for achieving sharp focus of at least two parts of the object lying at different distances from the camera, is made possible without tedious trial and error.

Ths object is carried out with the presently designed camera by providing at least one pair of markings in the visible focusing screen area, determining the ends of a basis of measurement, which are at a predetermined distance from one another, in a direction running at right angles in relation to the swing axis, and by providing a second scale with an accompanying pointer for the focusing arrangement for measuring the angle developed according to the formula $\sin \alpha = \Delta S/M$. M designates the dimension of the measuring base in units of linear measurement. $\Delta S$ designates the value of the difference of the focus distances in the same units of linear measurement, i.e., the dimension of the necessary focusing adjustment to focus sharply two parts of an object lying at different distances in front of the lens of the camera. $\alpha$ is the angle by which the carrier must be swung in order to simultaneously achieve sharp focus of the aforementioned parts of the object on both markings on the focusing screen.

With the camera designed in accordance with the present invention, the correct setting according to "Scheimpflug's rule" can be achieved exactly and easily, in the following manner: After the camera has been positioned in an approximately correct position in relation to the object, the focus of one part of the object is adjusted on the one marking on the focusing screen. Thereafter, the focusing distance between the image and the lens carrier is changed by means of the focusing arrangement in such a manner that, a second part of the object being at a different distance is focused sharply on the other marking of the screen. Now, the corresponding swing angle is read on the angle scale assigned to the focusing arrangement, resulting from the difference between the first and the second sharp focusing adjustment. This angular measure indicates the angle by which the pertinent carrier must be swung in order to find the setting which is correct according to "Scheimpflug's rule." The pertinent carrier is now swung in accordance with the before obtained indication of the angular measure. Whereupon, while maintaining the swing position so adjusted, the focus distance between the carriers is again changed until the image of the object sharply appears on the screen. If the actual swinging of the carrier was made correctly, it will now be possible to get the two considered parts of the object simultaneously sharply on the screen.

A difference which might possibly still exist with regard to a critical focus can be substantially eliminated by repetition of the above described processes.

Further characteristics, details and advantes of the invention will be shown from the following description of embodiments thereof, and the accompanying drawings in which the objects of the invention are illustrated principally by way of example:

The photographic focusing screen camera illustrated schematically in FIGS. 1 to 4 has a lens carrier 11 at its front thereof, a photographic lens 12 on carrier 11 and a picture carrier 13 provided at the rear of the camera. A focusing screen 15 lying within a frame 14 is mounted to carrier 13. A cassette (not shown) with light-sensitive photographic material may be attached to image carrier 13 by either first removing frame 14 and its screen, or by inserting the cassette between image carrier 13 and frame 14, whereby the frame is simply forced back against the force of holding springs (not shown). Lighttight folded bellows 16 extend between lens carrier 11 and picture carrier 13.

Lens carrier 11 and image carrier 13 are respectively mounted in place in the same manner by means of a pivotal or swinging arrangement 21 and a focusing arrangement 22, with a sleeve-like holder 23 attached for shifting and adjustable movement on a camera base 24 designed as an optical bench. Either swinging arrangement 21 allows swinging movement of carriers 11 or 13 about a horizontal swing axis 25, in usual or normal operating position of the camera. Axis 25 lies at right angles to the longitudinal axis of camera base 24. In addition, a second swinging arrangement for swinging movement about a vertical axis can be provided, although such is not shown in the present embodiment. Focusing arrangement 22 allows a changing of the distance between carriers 11 and 13, while the position of holder 23 on base 24 of the camera remains unchanged.

Figure 4:
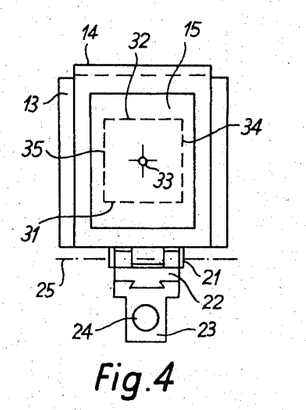
FIG. 4 is a rear elevational view of the camera shown in FIGS. 1 to 3.

As shown in FIG. 4, frame 14 and screen 15 are rectangular shaped, and picture carrier 13 is square shaped. In order to photograph with the camera upright size as well as broadside pictures, frame 14 together with screen 15 may be detached from picture carrier 13 and remounted thereon after shifting them by 90° in the well known manner.

A lower horizontal marking line 31 and an upper horizontal marking line 32 are provided on screen 15 for locating opposite ends of a vertically extending measuring base having the dimension M. Lines 31 and 32 are located between a center 33 and the opposite edges of screen 15, as shown in FIG. 4. Marking lines 31 and 32 are preferably equidistant from center 33 of the screen. Likewise, two vertical marking lines 34 and 35 are also provided on screen 15, again at a distance M from one another. These marking lines 34 and 35 are likewise disposed equidistant from center 33 of the screen, so that all four marking lines 31, 32, 34 and 35 together define a square, the center of which coincides with center 33 of screen 15.

The purpose of these marking lines is as follows:

It is assumed that two points of an object at different distances from camera lens 12 are to be focused sharply by photograph, and that the space between the focus of these two points of the object shall substantially occupy the available picture size of the photograph. Such two points can be, for example, a front and a rear corner of a book lying on a table which is to be photographed obliquely from above. In order to bring about the correct adjustment of the camera for such a picture, the following steps should be taken.

Figure 1:
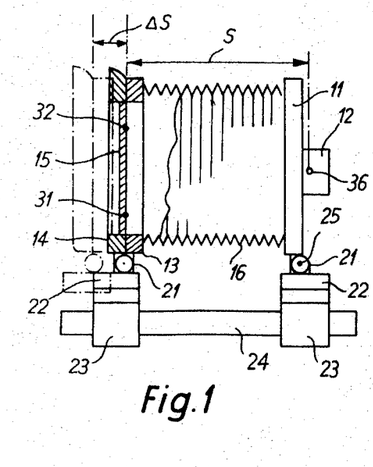
FIG. 1 schematically shows a photographic focusing screen camera in side elevation and partly in section, in accordance with the present invention.

First, the camera is pointed in its basic position according to FIG. 1 toward the object to be photographed so that the image of the object will become visible on screen 15 in such a manner that the projection of the rear corner of the book appears on lower marking line 31, and the projection of the front corner appears at upper marking line 32. Then, the image part of the rear corner of the book is sharply focused on lower marking line 31, for example, by adjusting holder 23 of image carrier 13 along camera base 24. The focusing arrangement 22 of lens carrier 11 can also be used for micrometric focusing although it is less suitable, for example, for close-ups. When the best possible sharpness of the image has been achieved for the rear corner of the book, then the image plane of the camera, coinciding with the front surface of screen 15, has a so-called "image or focus distance" S from the optical center 36 of the lens (FIG. 1). Afterwards, while using focusing arrangement 22 of image carrier 13, the latter is moved in such a position that the image of the front corner of the book appears sharply on upper marking line 32. For this purpose, the picture carrier 13 must be shifted farther back by a distance ΔS into the position shown in FIG. 1 in phantom lines. Distance ΔS will be called the difference of the image or focus distances in the following description.

Figure 2:
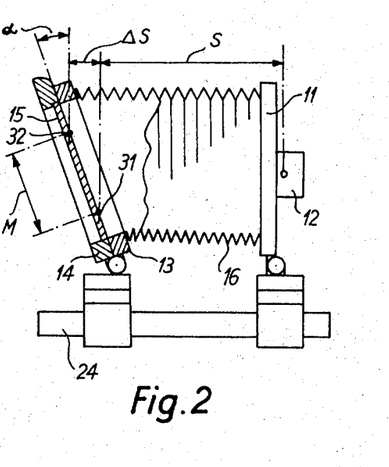
FIG. 2 is similar to FIG. 1 except that the image carrier is shown swung rearwardly in order to simultaneously achieve sharp focus of two parts of the object at different distances.
Figure 3:
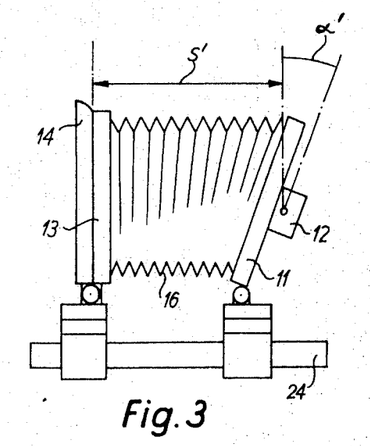
FIG. 3 is similar to FIG. 1 except that the lens carrier is shown swung forwardly.

In order to assure that both the projection of the rear corner of the book appears sharply on lower marking line 31 simultaneously with the projection of the front corner of the book on upper marking line 32, it will be necessary that picture carrier 13 be swung rearwardly by means of its respective swing arrangement 21 by an angle α, as shown in FIG. 2. The swinging angle α, needed for this results from the formula:

$$\sin \alpha = \Delta S/M$$

However, when picture carrier 13 is swung by angle α, determined in the manner described, the distances of marking lines 31 and 32 from the lens 12 will change. Thus, upon adjustment of picture carrier 13 by swinging it, its distance from lens 12 must be adjusted again by means of focusing arrangement 22 until a sharp image of the object develops on screen 15. In the image on the screen obtained in such manner both the front as well as the rear corner of the book are sharply focused simultaneously and thus the desired correction for sharpness or focusing is achieved (FIG. 2).

In order to avoit the need for any mathematical calculations or the consultation of tables, and to permit the operator to easily determine and adjust the required swing angle of carrier 13, the swinging arrangement 21 of carrier 13 and/or lens carrier 11 as well as the focusing arrangement 22 of image carrier 13 and/or of lens carrier 11 are provided, according to the invention with scales graduated in angular measuring units and with associated pointers, the scale of the focusing arrangement being divided according to the aforementioned formula. These scales are not illustrated in FIGS. 1 to 4 for the sake of better clarity, but are shown in the embodiment shown in FIGS. 5 to 8, and described hereinafter.

As well known, the desired correction for sharpness can also be achieved by swinging lens carrier 11 (FIG. 3) instead of image carrier 13. The advantage here is that the perspective of the picture is not changed, However, the focus is shifted somewhat as conditioned by the optical correction of the error due to the spherical shape of lens 12.

Therefore, the necessary difference $\Delta S$ of the focus distances and thus the required swing angle $\alpha$ are determined with the aid of that focusing arrangement related to image carrier 13, and lens carrier 11 is then swung by the swing angle $\alpha$ as found. The direction of the swing of lens carrier 11 must be opposite to that direction which would be correct for the image carrier 13 (Scheimpflug's rule). Furthermore, it is important that the swing angle $\alpha'$ necessary for achieving a precise correction for sharpness by swinging lens carrier 11, is only approximately equal to swing angle $\alpha$, by which image carrier 13 would have to be swung in order to bring about the correction for sharpness. It is true, that the deviation of the two above-mentioned angles $\alpha'$ and $\alpha$ is relatively small and can be disregarded for scale ratios smaller than 1:5. However, it is possible to eliminate the remaining error in correcting for sharpness, step by step, by repeating the aforementioned processes, starting with the swing adjustment of lens carrier 11, as determined and obtained in the manner described. For larger scale ratios of, for example, about 1:1, the correction for sharpness must be carried out preferably with image carrier 13, since in the close-up zone, every adjustment of the lens in the direction of the focus leads to a simultaneous change of the image and object distance and, thus, is problematic. Therefore, if the lens carrier is to be swung, other adjustment techniques are to be preferred for optical reasons in such cases. It is advantageous in practice, however, to carry out the last delicate step of correction for sharpness in every case by swinging picture carrier 13 in the above-described manner.

Whenever, contrary to the showing in FIG. 4, frame 14 with is screen 15 is attached to image carrier 13 in a position displaced by 90° for the taking of broad-side or horizontal pictures, the other two marking lines 34 and 35 are used instead of 31 and 32.

With reference to FIGS. 5 to 8, an embodiment by way of example, of a photographic focusing screen camera will now be explained in more detail which is provided with the abovementioned scales and pointers, which will facilitate the determination of the necessary swing angle and the adjustment of the correct swing position of the image carrier or of the lens carrier. For the sake of simplicity, merely the adjusting arrangements for image picture carrier 13 are shown in FIGS. 5 to 8, since the adjusting arrangements for the lens carrier are substantially the same. Those identical elements of FIGS. 1 to 4 are similarly referenced in FIGS. 5 to 8.

Figure 5:
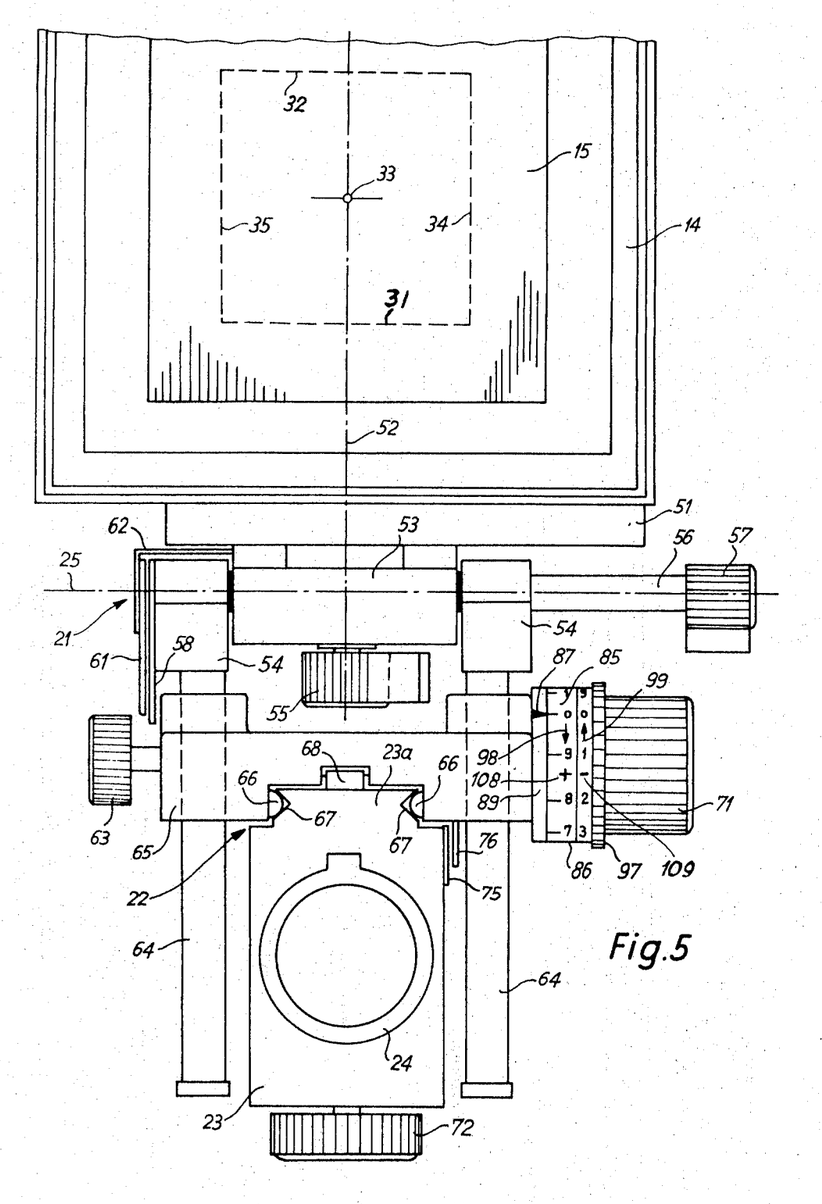
FIG. 5 is a partial view similar to FIG. 4 although slightly enlarged and showing more details.
Figures 6, 7, 8:
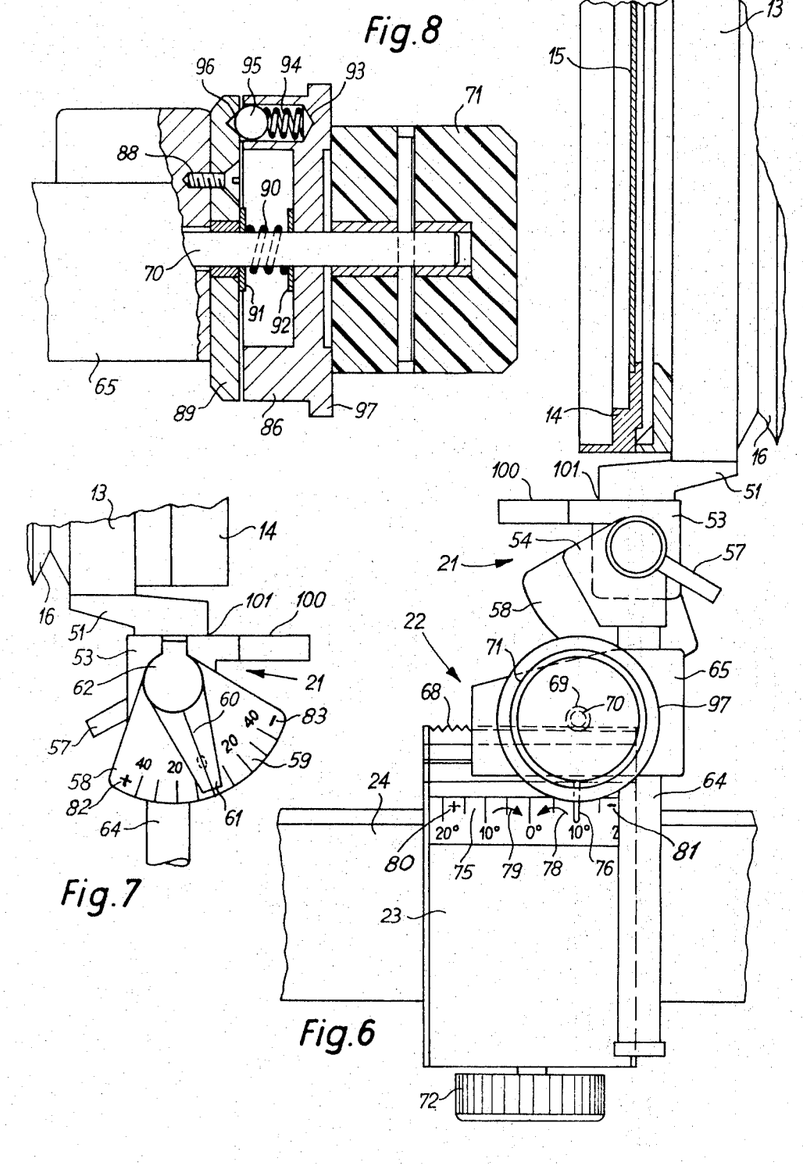
FIG. 6 is partial side elevational view of the camera of FIG. 5, partly in section.
FIG. 7 is a detail view of the pivotal mounting in opposite side view as compared to that shown in FIG. 6.
FIG. 8 is a slightly enlarged detail view of the focusing arrangement shown in FIG. 5.

As shown in FIGS. 5 and 6, image carrier 13 of the camera is attached to a rail 51 which is mounted on a connecting piece 53 for rotation about a perpendicular axis 52. The connecting piece is mounted between two bearing bodies 54 for rotation about a horizontal axis 25 which is the swing axis mentioned earlier, about which image carrier 13 can be swung. Parts 53 and 54 together thus form swinging arrangement 21.

A knob 55 is provided at the underside of connecting piece 53 for the releasing or loosening of a clamping mechanism which firmly clamps down rail 51 in the desired position relative to connecting piece 53. A clamp spindle 56 is provided for clamping down connecting piece 53 in the adjusted swing position relative to bearing bodies 54. One end of clamp spindle 56 is provided with a handle 57, which permits the loosening and tightening of the clamp spindle.

A plate 58 is attached to one of the bearing bodies 54 facing away from handle 57, which plate has a scale 59 for the swing angle, as shown in FIG. 7. An index line 60 disposed on a pointer 61 of transparent material is provided for scale 59. Pointer 61 is securely attached to connecting piece 53 by means of a connecting element 62 (FIGS. 5 and 7), so that index line 60 will sweep across scale 59 as connecting piece 53 is rotated. Scale 59 for the swing angle is graduated in any desired manner into units of angular measurement, for example, in angular degrees such that the scale of the swing angle, starting out from zero extends in two opposite directions. Also, the arrangement is such the index line 60 pints to zero on scale 59 whenever image carrier 13 assumes its basic position lying perpendicular to the longitudinal axis of camera base 24.

The two bearing bodies 54 are respectively attached to the upper ends of guide rods 64 which extend parallel to carrier 13 in its basic position. Each guide rod 64 is mounted for longitudinal sliding movement in a fitting bore of a yoke 65 which interconnects the two guide rods. Image carrier 13 together with the above-described swinging arrangement can be vertically adjusted by means of guide rods 64 relative to yoke 65. A clamping screw 63 is provided for clamping down carrier 13 and its swinging arrangement against one of guide rods 64 to fix the image carrier in its vertical adjustment.

Yoke 65 constitutes a part of focusing arrangement 22 and is provided with sliding skids 66 which engage with V-shaped guide grooves 67 of a head part 23a of holder 23 slideably mounted on camera base 24. Head part 23a is also provided with a toothed rack 68 extending along its upper surface, with which a small pinion 69 angages (FIG. 6). Pinion 69 is provided on a shaft 70 which is rotatably mounted in yoke 65 and carries a control knob 71 on one of its ends (FIGS. 5, 6 and 8). By turning knob 71, yoke 65 can be moved in a forward or rearward direction relative to holder 23 in a known manner by means of pinion 69 engaging with the toothed rack 68 to thereby alter the distance between image carrier 13 and the lens carrier for focusing of the camera. For coarse focusing, holder 23 can be manually shifted along camera base 24. A clamping screw 72 serves to secure holder 23 in the desired position along camera base 24.

As seen in FIGS. 5 and 6, a lateral outer surface of holder 23 is provided with a scale 75 for determining or measuring the swing angle necessary to adjust the position of carrier 13. A mark 76 in the form of a pointer attached to yoke 65 cooperates with scale 75 for a reading thereof. Scale 75 extends in a straight line from a zero point in two opposite directions. The arrangement is made effectively in such a way that pointer 76 points to the zero point of scale 75 for the measurement of the angle whenever yoke 65 is at the center of its shifting path. Scale 75 is graduated in the same units of angular measurement as scale 59 according to the formula:

$$\sin \alpha = \Delta S/M ;$$

whereby the values α, ΔS and M have the same significance as in the first example. Since the sine function still extends approximately linearly for an angular range from 0° to 20°, scale 75 for measuring the angle has a nearly linear graduation.

As shown in FIG. 6, scale 75 has two oppositely oriented directional arrows 78 and 79, which are each assigned to sections of the scale extending in different directions from the zero point. Directional arrows 78 and 79 signal the direction of swing required in order to produce the correction for sharpness by a swinging of image carrier 13.

For the same purpose, in lieu of arrows 78 and 79 or additionally, other marks can be provided on scale 75 and on scale 59. Thus, for example, in FIG. 6, the left half of scale 75 is marked with a plus sign 80 and the opposite half of the scale is marked with a minus sign 81. Similarly, in FIG. 7, one half of scale 59 for the swing angle has a plus sign 82 and the other half has a minus sign 83. The halves marked with plus signs 80 and 82 of scales 75 and 59 are provided for sharpness corrections which increase the image or focus distance from the lens of the camera. Instead of being marked by plus and minus signs, the two opposite halves of scales 75 and 59 can also be shown in varying colors, as for example, red for corrections by increasing and blue for corrections by reduction of the focus distance of the pertinent image point from the lens.

A second scale 85 for the measuring angle, with a spread graduation, is located on the periphery of a drum 86 (FIGS. 5 and 8) which is rotatably mounted on the shaft 70 of the vernier drive arrangement relative to the turning of shaft 70. A pointer 87 (FIG. 5) for scale 85 is disposed on a disc 89 secured to yoke 65 by screws 88 (FIG. 8). Drum 86 is hollow and houses a compression spring 90 which surrounds shaft 70. The ends of the spring are respectively mounted on annular discs 91 and 92 lying respectively against disc 89 and the front wall of drum 86. Drum 86 is urged in an axial direction against rotating knob 71 under the influence of spring 90 in order to produce a positive rotational connection between the rotating knob and the drum. A compression spring 94 and a ball 95 are located in a bore 93 of drum 86, which is parallel to shaft 70. Ball 95 is urged in the direction against disc 89 under the influence of spring 94. Disc 89 is provided with a small recess 96 with which the ball 95 can engage in order to determine a certain basic position of drum 86, in which basic position the zero point of scale 85 for the measuring angle is opposite the pointer 87, as shown in FIG. 5. It should be pointed out that the frictional connection between rotating knob 71 and drum 86 is sufficiently firm so that drum 86 may be driven even if ball 95 is in engagement with recess 96 of disc 89. Drum 86 has a peripheral edge 97 with a larger diameter to permit drum 86 to be rotated in relation to knob 71. Scale 85 for the measuring angle, having a curved course, extends in two opposite directions starting from zero and is graduated in angular degrees according to formula:

$$\sin \alpha = \Delta S/M ;$$

whereby the values, α, ΔS and M have the same meaning as heretofore mentioned. Since the sine function extends approximately linearly for angles between 0° and 20°, scale 85 can be divided evenly with such a precision that will suffice in practice. In the embodiment shown, a full turn of drum 86 corresponds to a measuring angle of 10°, so that the same graduation marks are valid for larger measuring angles between 10° and 20° as for measuring angles between 0° and 10°.

As clearly shown in FIG. 5, two oppositely directed arrows 98 and 99 are provided on scale 85 for the measuring angle, which are respectively assigned to a section of the scale extending from zero in opposite directions. These directional arrows 98 and 99 first of all signal the rotational direction of rotating knob 71 necessary for an enlargement or recuction of the distance of image carrier 13 from lens carrier 11; and secondly, they signal the direction of swing of the image carrier which is necessary to produce the compensation for sharpness by swinging image carrier 13.

In lieu of arrows 98 and 99 or additionally, other markings can be assigned to the two oppositely extending sections of scale 85 for the measuring angle; for example, plus signs 108 and minus signs 109 which signal the direction of the correction for compensation for sharpness by enlargement or reduction of the distance between the pertinent image point and the lens of the camera, corresponding to signs 80, 81, or 82, 83 of scales 75 and 59. Also, the oppositely extending sections of scale 85 for the measuring angle can be represented in varying colors, in accordance with the colors of the corresponding sections of scales 75 and 59.

Whenever two points or parts of an object at different distances in relation to the camera are to be sharply focused, the same approach may be taken for producing the corrections (compensation) for sharpness, as described with reference to FIGS. 1 to 4. For a better understanding, the FIGS. 5 to 8 embodiment will be similarly described, namely, considering a perspective view or image of a book from above lying aslant on a table, whereby the foremost as well as the hindmost corner of the book is to be sharply focused on the image plane.

After the camera, in its basic position (FIG. 1), has been pointed toward the object to be photographed in such a way that the projection of the hindmost corner of the book lies at a point on lower marking line 31 of screen 15 and the projection of the foremost corner of the book lies at a point of upper marking line 32 of the screen, the distance S (image distance) (FIG. 1) between image carrier 13 and the lens 12 is first adjusted in such a manner that the image of the hindmost corner of the book will appear sharply on lower marking line 31. For doing so, it is preferred to shift holder 23 of image carrier 13 on camera base 24 and to leave focusing arrangement 22 of image carrier 13 in its middle position, at which pointer 76 is opposite zero of scale 75, or pointer 87 is opposite zero of scale 85 of the measuring angle. Whenever the best possible sharp focusing of the image of the hindmost corner of the book is achieved on lower marking line 31, holder 23 is fixed by means of clamping screw 72 and the image carrier 13 is then shifted by operation of knob 71 of focusing arrangement 22 for image carrier 13, said carrier 13 being shifted in such a way that the image of the foremost corner of the book now appears sharply on upper marking line 32. Whenever this is achieved, the measuring angle indicated is read on scale 75 and/or on the second scale 85 opposite their respective pointers 76 and 87, and the directional signs 78 or 79, 80 or 81, 98 or 99, or 108 or 109 of the particular section of the scale is taken into account. Thereafter, clamping spindle 56 is released by means of handle 57 and image carrier 13 is swung in the direction signalled by the above-mentioned directional sign by the angle read from scale 75 and/or 85 for the measuring angle, which can be accomplished easily and precisely with the aid of scale 59 for the swing angle and its pointer 60. By tightening clamping spindle 56 with handle 57, image carrier 13 is fixed in its adjusted swinging position. Whenever this has been accomplished, the image on screen 15 is again sharply focused by means of focusing arrangements 22 of image carrier 13, so that the foremost and hindmost corners of the book to be photographed are now sharply focused simultaneously. Thus the desired correction (compensation) for sharpness has been achieved.

If a certain error in compensation for sharpness should still be noticeable following this procedure, it can be substantially eliminated by repeating the above-described steps starting out from the almost correct oblique position of image carrier 13.

It is possible, although less practical, to swing lens carrier 11 rather than image carrier 13 to effect a compensation for sharpness, and to use the focusing arrangement of lens carrier 11 and the scale for measuring angle provided therefor. It will be more effective to determine the swing angle required for the correction of sharpness with the aid of focusing arrangement of image carrier 13 and scales 75 and/or 85 thereof than to swing lens carrier 11 by the angle obtained, but in opposite direction to that required for the image carrier.

For determining the swing angle needed for the correction of sharpness, focusing arrangement 22 of carriers 13 or 11 need not be initally set in its middle position, since drum 86 may be appropriately adjusted.

For example, a sharp focusing on lower marking line 31 of the projection of one point of the object, for example, of the hindmost corner of a book that is to be photographed, can be accomplished according to choice, with the use of focusing arrangement 22 of lens carrier 11 or of image carrier 13. Whenever the best possible sharpness of the image has been achieved, rotating knob 71 of the precision or vernier drive device of the particular focusing arrangement is held firmly with one hand and drum 86 is rotated with the other hand by means of its peripheral edge 97 until ball 95 engages with recess 96 (FIG. 8). The zero point of scale 85 of the measuring angle will then be opposite its pointer 87. Thereafter, drum 86 is released and rotating knob 71 is turned until the best sharpness of the image of the other point of the object, for example, the foremost corner of the book, is reached on upper marking line 32, whereby drum 86 is frictionally driven. After a sharp focusing has been achieved, the required swing angle can be read on scale 85 opposite pointer 87. One of the carriers 13 or 11 must then be swung by the determined angle in order to be able to simultaneously achieve sharp focus of the two points of the object.

Instead of providing an adjustable scale 85 with reference to pointer 87, as in the described embodiment, it is also possible to make the pointer shiftable along the scale of the measuring angle, whereby again a detent, for example, by means of spring loaded ball 95 and recess 96, can be provided for the determination of a certain mutual adjustment at which the pointer will be opposite the zero point of the scale.

Correspondingly, pointer 76 on yoke 65 may be made slidable along scale 75 of the measuring angle so that, after a sharp focusing has been achieved for the projection of a first point of the object on lower marking line 31, pointer 76 can be placed opposite the zero point of scale 75. After subsequent achieving a sharp focusing of a second point of the image on upper marking line 32, pointer 76 then indicates on scale 76 the angle by which image carrier 13 or possibly lens carrier 11 must be swung so that simultaneous sharp images of the two mentioned points of the object may be obtained.

A simplified embodiment of the camera is also possible as having only scale 75 of the measuring angle or only scale 85 of the measuring angle. Moreover, only focusing arrangement 22 of the image carrier 13 may be provided with a scale 75 or 85 of the measuring angle and an accompanying pointer, or with both scales 75 and 85, the focusing arrangement of lens carrier 11 having no such scale. Scale 59 of the swing angle and its accompanying pointer (FIG. 7) will preferably be provided for image carrier 13 as well as lens carrier 11.

The camera illustrated in FIGS. 5 to 8 also permits corrections to be easily made for sharpness for the images of two points of the object which are positioned laterally with different distances from the lens of the camera.

For example, the image part of the one of two points of the object taken into consideration is projected on marking line 34 and the image part of the other of these points of the object is projected on marking line 35. First, the best possible sharpness of the image of one point of the object is sought on line 34, whereby care must be taken that the zero point of at least one of the scales 75 and 85 of the measuring angle is opposite respective pointers 76 and 87. Thereafter, the best possible sharpness of the image of the other relevant point of the object is adjusted on marking line 35 by operating rotating knob 71, after which the scale of the measuring angle is read. In order to now produce the desired corrections for simultaneous sharpness of the images of both pertinent points of the object, image carrier 13 or possibly lens carrier 11 must be swung about its vertical swing axis 52 by the angle obtained from the previously mentioned reading of scale 75 or 85 of the measuring angle. For this purpose, the top side 100 of connecting piece 53 (FIGS. 6 and 7) is provided with a scale for the swinging angle, not shown in the drawing, with which an edge 101 of rail 51, serving as a pointer, or a special pointer attached to said rail, cooperates in known manner. Whenever the appropriate carrier 13 or 11 has been swung in the described manner, simultaneous sharp focusing of the two mentioned points of the image can be achieved on marking lines 34 and 35 by means of the focusing arrangement of image carrier 13 and/or of lens carrier 11.

It can therefore be clearly seen that, with the present camera corrections for sharpness can be achieved step-by-step for pictures of points of an object at different distances spaced vertically as well as horizontally whereby image carrier 13 and/or lens carrier 11 must be swung about horizontal swing axis 25, as well as about the vertical swing axis 52.

Of course, image carrier 13 and frame 14 of the screen of FIGS. 5 to 8 can be substituted for screens of different sizes or different formats. Such is possible so long as marking lines 31 and 32 or 34 and 35, which extend parallel to one another on screens 15 of different sizes or differenz formats, always have the save distance between them, so that the basis of measurement M always remains the same. If, however, a screen is used on which another measuring basis M is marked, then scales 75 and 85 for the measuring angles are no longer valid. In such case, either a recalculation is necessary or it will become necessary to also substitute the scale of the measuring angle together with the screen in each instance. For such purpose, several constructional means can be provided in order to effect a simple substitution. But it is also possible to provide two or more scales of the measuring angle with different graduations, each of which is adapted to a different measuring basis M, whereby special markings or colorings will assure that the danger of confusion is reduced. In such case, two or more measuring bases of variable magnitude can also be marked on a single screen.

Finally, it should be pointed out that markings 31, 32 or 34, 35 determining the ends of the measuring base M do not need to be provided directly on screen 15 itself, but can alternatively be provided on a transparent glass plate or similar element which is placed on the screen 15. It is also possible to make such a glass plate smaller than the screen so that markings 31, 32, 34, 35 can be shifted thereon without there occurring any change in the measuring basis M, for example, so that the marking lines may be moved to coincide with the images of particular points of the object.

Obviously, many other modifications and variations of the present invention are possible in the light of the above teachings. It is therefore to be understood that within the scope of the appended claims, the invention may be practiced otherwise than as specifically described.

What is claimed is:

1. Photographic focusing screen camera including an image receiver carrier and a lens carrier having a camera lens mounted thereon, an elongated camera base, said carriers each being mounted on said base, a focusing arrangement having means for varying the focus distance between said carriers provided for at least one of said carriers, a swinging arrangement provided for said one carrier and having means for swinging it about a swing axis relative to the other of said carriers, said swinging arrangement being provided with first scale means for the swing angle and an accompanying first pointer means for reading the adjusted swing position of said one carrier as compared to a basic zero position thereof, said first scale means having a scale element graduated in units of angular measurement, said image carrier having a focusing screen mounted thereon with at least one pair of spaced first markings located at a predetermined distance from one another for determining limitations of a measuring basis on said screen, which measuring basis extending perpendicularly to said swing axis of said one carrier, said means for varying the focus distance between said carriers being provided with second scale means and an accompanying second pointer means for a measuring angle, said second scale means having a scale element graduated in units of angular measurement developed according to the formula: $\sin \alpha = \Delta S/M$ where M is the dimension of said measuring basis in units of linear measurement, $\Delta S$ is a difference in focus distances between said lens and said markings on said screen in the same units of linear measurement, i.e., the extent of the necessary shift of said focusing arrangement for changing the sharp focusing of images produced on one and the other of said markings of two parts of an object lying at different distances from said lens, and $\alpha$ is the angle by which said one carrier is to be swung in order to simultaneously focus sharp images of the two parts of the object on said two markings.

2. Camera as in claim 1, wherein the scale elements of said first and second scale means are graduated in the same units of angular measurement.

3. Photographic focusing screen camera including an image receiver carrier and a lens carrier having a camera lens mounted thereon, an elongated camera base, said carriers each being mounted on said base, a focusing arrangement having means for varying the focus distance between said carriers provided for at least one of said carriers, a swinging arrangement provided for said one carrier and having means for swinging it about a swing axis relative to the other of said carriers, said swinging arrangement being provided with first scale means for the swing angle and an accompanying first pointer means for reading the adjusted swing position of said one carrier as compared to a basic zero position thereof, said first scale means having a scale element graduated in units of angular measurement, said image carrier having a focusing screen mounted thereon with at least one pair of spaced first markings located at a predetermined distance from one another for determining limitations of a measuring basis on said screen, which measuring basis extends perpendicularly to said swing axis of said one carrier, said means for varying the focus distance between said carriers being provided with second scale means and an accompanying second pointer means for a measuring angle, said second scale means having a scale element graduated in units of angular measurement developed according to the formula: $\sin \alpha = \Delta S/M$ whereby M is the dimension of said measuring basis in units of linear measurement, $\Delta S$ is a difference in focus distances between said lens and said markings on said screen in the same units of linear measurement, i.e., the extent of the necessary shift of said focusing arrangement for changing the sharp focusing of images produced on one and the other of said markings of two parts of an object lying at different distances from said lens, and $\alpha$ the angle by which said one carrier is to be swung in order to simultaneously focus sharp images of the two parts of the object on said two markings, the graduations of said scale element of the measuring angle and said scale element of the swing angle having a zero point and extending in opposite directions therefrom, the graduations being variably marked in said directions in such a manner as to indicate the directions of the scale of the measuring angle and of the scale of the swing angle, corresponding one to the other.

4. Camera as in claim 3, wherein said second pointer means for said second scale means of said focusing arrangement is mounted for adjustable movement in longitudinal direction of the scale of the measuring angle.

5. Camera as in claim 4, wherein said second pointer means includes a pointer for said scale element of said second scale means, and wherein said scale element and said second pointer means are provided with means for setting said pointer at a desired basic position with respect to said scale.

6. Camera as in claim 3, wherein said scale element of said second scale means of the focusing arrangement is mounted for adjustable movement with respect to said second pointer means.

7. Camera as in claim 6, wherein said second scale means and said second pointer means are provided with means for setting said scale element of the second scale means at a desired basic position with respect to the scale of the measuring angle.

8. Camera as in claim 3, wherein said focusing arrangement includes a holder element for mounting said one carrier on said base, and further includes a yoke member supporting said one carrier on said holder element for shifting movement in relation thereto, said scale element of said second scale means of the focusing arrangement being located on one of said holder element and yoke member, and said second pointer means being located on the other of said yoke member and holder element, and the graduations of said scale element of said second scale means being disposed along a straight line.

9. Camera as in claim 3, wherein said focusing arrangement includes a precision drive having adjacent stationary and rotatable members, said second scale means being located at one of said stationary and rotatable members and the second pointer means being located at the other of said stationary and rotatable members, whereby the graduations of said scale element of said second scale means are disposed along a curved course.

10. Camera as in claim 3, wherein said scale element of said second scale means has directional arrows for indicating the direction of swing of said one carrier required for producing a correction of focus sharpness.

11. Camera as in claim 3, wherein at least two image carriers and focusing screens of different size are provided and adapted to be mounted and used selectively, said focusing screens each having markings for determining limitations of differently dimensioned measuring bases, and wherein at least two differently graduated scale elements of the second scale means of the focusing arrangement are provided, in correspondence with said different measuring bases.

12. Camera as in claim 11, wherein said scale element of the second scale means is removably and exchangeably mounted at said focusing arrangement.

13. Camera as in claim 3, wherein said pair of markings are constituted by straight parallel lines spaced from one another by a distance equal to the dimension of said measuring basis.

14. Camera as in claim 3, wherein said focusing screen is provided with a second pair of spaced markings located at a predetermined distance from one another for determining limitations of a second measuring bases which extend in a direction at right angles to said first named measuring basis, the first and second measuring basis having equal dimensions.

15. Camera as in claim 14, wherein said first and second pair of markings are each constituted by straight parallel lines spaced from one another by a distance equal to the dimension of said measuring basis.

16. Camera as in claim 15, wherein the markings together form a square having a center which coincides with a center of said focusing screen.

17. Camera as in claim 3, wherein said markings are adapted to be moved on said focusing screen, the distance between said markings being constant.

18. Camera as claimed in claim 3, wherein said focusing screen has at least two pairs of markings located at different predetermined distances from one another for determining limitations of at least two differently dimensioned measuring bases, and wherein said second scale means of said focusing arrangement is provided with at least two differently graduated scale elements, in correspodence with said different measuring bases.

* * * * *